United States Patent [19]
Varner

[11] 3,927,645
[45] Dec. 23, 1975

[54] SELECTIVE BIRD FEEDER
[76] Inventor: David E. Varner, 5302 Duvall Drive, Washington, D.C. 20016
[22] Filed: Mar. 27, 1975
[21] Appl. No.: 562,690

[52] U.S. Cl. .............................. 119/51 R; 119/63
[51] Int. Cl.² ........................................ A01K 5/00
[58] Field of Search ............... 119/51 R, 63, 23, 26

[56] References Cited
UNITED STATES PATENTS

| | | | |
|---|---|---|---|
| 2,306,312 | 12/1942 | Hyde | 119/51 R |
| 3,211,130 | 10/1965 | Prince | 119/51 R |
| 3,399,650 | 9/1968 | Goodman | 119/51 R |
| 3,482,549 | 12/1969 | Episcopo | 119/51 R |

*Primary Examiner*—Hugh R. Chamblee
*Attorney, Agent, or Firm*—Cushman, Darby & Cushman

[57] ABSTRACT

A selective bird feeder providing access to clinging birds but not to perching birds. Direct flight access to food is blocked by a shield, preferably transparent. A rough surface to which some birds can cling extends from under the shield so that clinging birds can light thereon, cling thereto and so make their way to food in the feeder. The shield assists in protecting the food from the weather while access by clinging birds is had under all weather conditions.

10 Claims, 4 Drawing Figures

U.S. Patent  Dec. 23, 1975  3,927,645
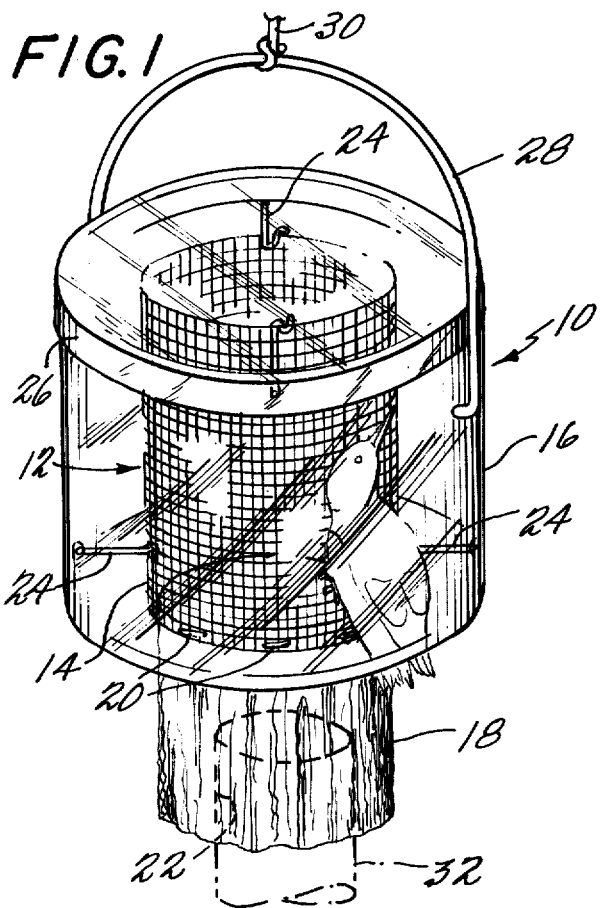
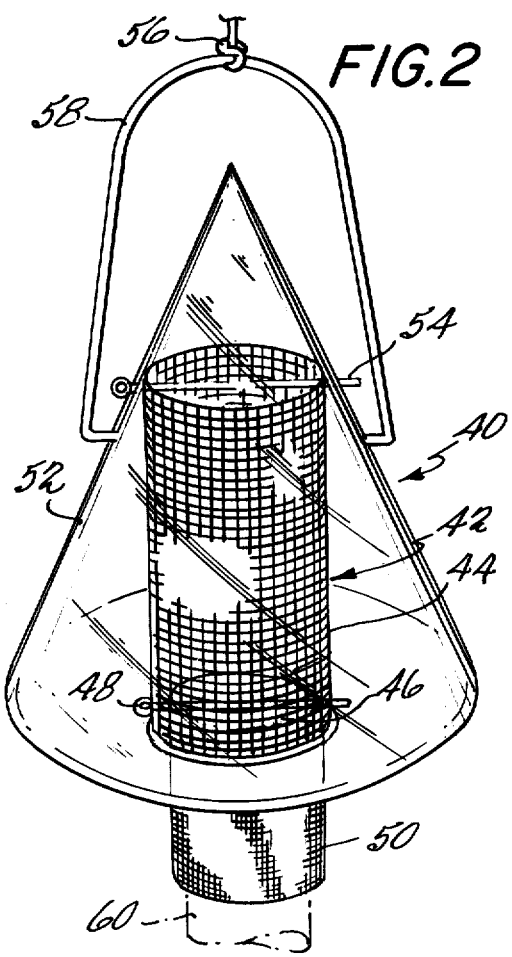
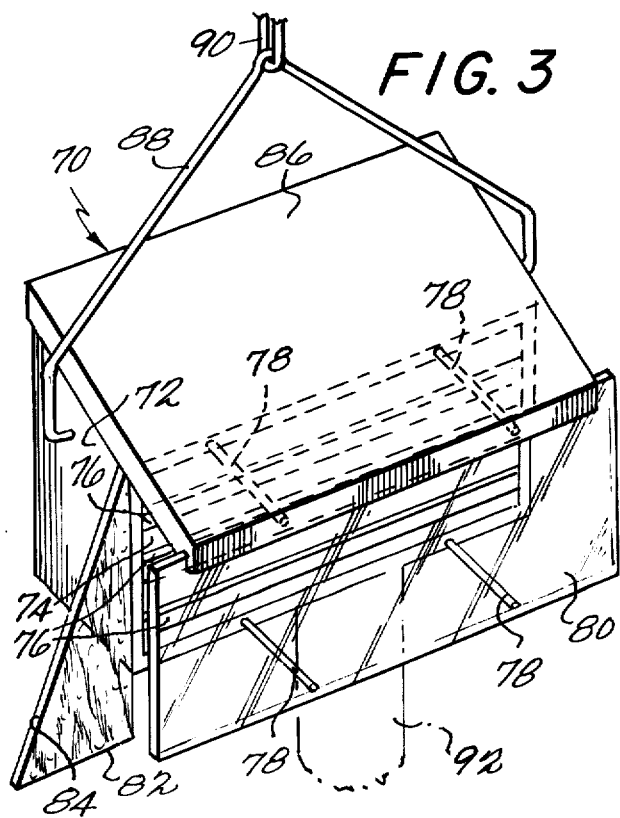
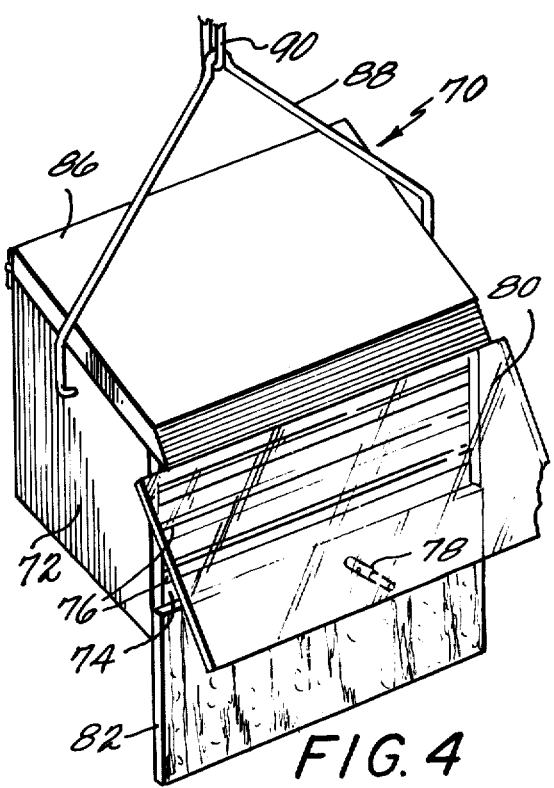

SELECTIVE BIRD FEEDER

DETAILED DESCRIPTION OF THE INVENTION

This invention relates to feeders for wild birds, and more particularly to selective bird feeders, i.e. which permit certain types of birds to feed and do not allow others. Certain of the larger birds, including starlings, grackles and the like, which usually travel in large flocks, are considered by some to be most unattractive nuisances, particularly as respects a bird feeder. Once such birds locate the usual type of feeder accessible to almost all varieties, they arrive in droves and rapidly consume all available bird food. Not only do starlings and the like gobble up large quantities of food from a feeder but once they find one, they return again and again to the discouragement of other birds considered much more attractive.

These unattractive birds are of the perching type, i.e. those which grasp a perch, such as a tree limb or twig, with their feet. Another type, usually considered attractive, is the so-called clinging bird which literally has the ability to cling, apparently by its toenails, to a rough or soft surface, such as the bark of trees, without a perch-grasping action. Such clinging birds include woodpeckers, flickers, creepers, sapsuckers, and the like. Further, certain small agile birds, such as chickadees, titmice and others seem to have some clinging ability although not to the same extent as the true clingers. This invention makes use of such clinging ability of certain birds.

Most conventional bird feeders not only are unselective but also are subject to having access to food therewithin blocked by snow or ice during winter storms when wild birds are in most need of food. In some feeders the food is even exposed, almost entirely, to the weather.

Accordingly, it is an object of this invention to provide a selective bird feeder at which certain types of birds, including certain of those usually considered unattractive nuisances, cannot feed but at which other types, usually considered more attractive, can feed.

Another object of the invention is to provide a selective bird feeder at which perching birds usually cannot feed but at which clinging birds and others of comparable agility can feed.

Another object of this invention is to provide a selective bird feeder of simple, inexpensive construction which will accomplish the foregoing objects.

A further object of this invention is to provide a bird feeder which not only is selective but also is accessible in snowing and icing conditions.

Other objects and advantages will become apparent from the following description and accompanying drawings in which:

FIG. 1 is a perspective view of a selective bird feeder embodying this invention;

FIG. 2 is a perspective view of another embodiment of a bird feeder embodying this invention;

FIG. 3 is a perspective view of another embodiment of a bird feeder embodying this invention;

FIG. 4 is a perspective view of still another embodiment of a bird feeder, similar to that shown in FIG. 3, embodying this invention.

DETAILED DESCRIPTION OF INVENTION

This invention is based upon the fact that certain birds can, as aforesaid, apparently cling by their toenails to the bark of trees which is relatively rough or soft, while others cannot. Included in the latter are so-called perching birds, which means that they grasp a branch, a so-called perch or the like with their feet. With this in mind, reference is made to FIG. 1 wherein there is shown a bird feeder 10 embodying this invention. The feeder 6 includes a container or enclosure 12 for bird food which, in this embodiment, has its sides 14 made of so-called hardware cloth, i.e. ¼ inch, ⅜ inch or ½ inch mesh screen, usually of stiff weather- and rust-resistant metal. The enclosure 12 is upright tubular in configuration, i.e. preferably circular, as shown, but possibly rectangular or square in horizontal section.

The function of the enclosure 12 is to receive and hold bird food while making it accessible to birds for feeding; that is, the openings in sides 14 made of the screen are large enough for the beaks of certain desirable or attractive birds to pass therethrough. The invention is especially designed to permit access to the food by the so-called clinging birds. Clinging birds normally are of those types which prefer insects as their food, as contrasted to types which prefer grain and other seed, berries, fruit, etc. Such clinging birds include woodpeckers, nuthatches, creepers, sapsuckers and others of comparable habits. Accordingly, the feeder of this invention is intended primarily for the presentation of suet either raw or in cake form, i.e. melted and reconstituted sometimes with bird seed mixed therewith. Gobs of peanutbutter also are a type of bird food useful for a feeder of this invention. Thus, it will be seen that if suet, peanutbutter or the like is placed within the enclosure 12, birds which have access to the sides 14 of the enclosure, can peck through the openings in the screen forming such sides and eat the bird food therewithin, preferably suet in some form.

Coaxially surrounding the enclosure 12 in spaced, generally coextensive relation therewith is a shield 16, preferably of stiff transparent material, e.g. plastic, although it can be made of screening, e.g. hardware cloth. The purpose of the shield 16 is to prevent direct access to the sides 14 of the enclosure 12 by a bird in flight while permitting a bird of the clinging type to enter into and clingingly move within the space between the shield 16 and the sides 14 of the enclosure so as to have access to food within the latter. As mentioned, the shield 16 preferably is of transparent plastic material which prevents birds from clinging thereto while permitting them to see the bird food in the enclosure as well as to be watched while feeding. The space between the shield 16 and the sides 14 of the enclosure 12 is narrow enough to prevent an undesirable type bird from flying thereinto but wide enough to permit a bird, preferably of a desirable type, to move therein by clinging movements.

The bottom of the enclosure 12 is formed by a plug 18 of material, e.g. wood, having a barklike, preferably somewhat rough or soft, surface to which certain types of birds may cling. The plug 18 is elongated downwardly so as to depend a considerable distance below the lower edge of the shield 16 and is suitably fastened to the screen forming the sides 14 of the enclosure 12 by staples 20 or the like. Preferably the material forming the plug 18 is light in weight and in order to further reduce the weight of the plug, it may be cored out from below to provide an elongated socket 22 extending upwardly into the plug from its bottom.

It thus will be seen that the feeder 10 has no means on which birds can perch, or light and stand on, for access to the food in the enclosure 12. That is, they cannot fly directly to a perchable or standable feeding location on the feeder 10. At the same time, clinging birds can fly directly to, light on and cling to the rough surface provided by the depending plug 18. Once clinging to that surface, a clinging type bird, e.g. a woodpecker, can readily move by clinging movements upwardly into the space beneath the shield 16 and thus have access to food in the enclosure.

It has been observed in actual practice that this is so with respect to an embodiment of the invention constructed generally in accordance with that illustrated in FIG. 1. That is, it has been observed that perching birds, particularly starlings, cannot reach food in the enclosure 12 while woodpeckers, in particular downy woodpeckers, readily light on, cling to, and clingingly move upwardly on the depending plug 18 to feed on the food in the enclosure. Further, although the undesirable birds try to reach the food when the feeder 10 is filled initially, on finding they are unable to do so, soon give up and leave to the great comfort of the more desirable types.

As will be seen, the shield 16 is at least vertically coextensive with the screen forming the sides 14 of the enclosure 12 and may even extend somewhat therebelow to render it more difficult for perching birds to have access or otherwise reach food in the enclosure 12. The shield 16 is supported in concentric spaced relation with the enclosure 12 by suitable spacing and supporting members 24, e.g. stiff wire or the like, appropriately secured to and between the shield 16 and the sides 14 of the enclosure 12. The lowermost of these spacing members 24 is well above the lower edge of the shield 16 to prevent an agile perching bird from somehow reaching and perching thereon. Certain of the smaller, more agile birds with some clinging ability, however, e.g. chickadees, can make their way inside the shield 16 and feed. Starlings, grackles, and such larger perching birds definitely cannot.

The top of the enclosure 12 is formed by a removable cap 26 which desirably is large enough to also cover the top of the space between the enclosure 12 and the shield 16. Preferably, the cap 26 is also of transparent plastic material and obviously is removable to permit the enclosure 12 to be filled and refilled with bird food. It will be seen that the cap 26 and shield 16, when made of plastic, protect food in the enclosure 12 from rain, snow, and ice while the arrangement of the feeder, which provides access to food only from below, prevents such access from being blocked by snow or ice. The feeder 10 can be supported by any appropriate conventional means. For example, a bail 28 can be attached to the shield 16 for suspending the feeder 10 from the limb of a tree by an appropriate line or cord 30. Alternatively, the feeder 10 can be supported on the upper end of a slender ground-engaging rod or post 32, the upper end of which fits within the socket 22 in the plug 18, as shown in dotted lines.

Referring now to FIG. 2 of the drawings, there is shown a feeder 40 comprising a somewhat simpler embodiment of the invention having an enclosure 42 similar to that shown in FIG. 1, i.e. having its sides 44 formed of hardware cloth. The bottom of the enclosure 42 may, if desired, be formed by a relatively thin plug 46 of plastic or like material suitably fastened within the lower end of the tubular screen forming the sides 44 by a transverse pin 48. The rough access surface may be provided by a cylinder 50 of weather-resistant fine screen, e.g. 1/64 inch mesh which may be interiorly reenforced, such as by a cylinder of plastic material having the screen suitably fastened thereto. The cylinder 50 depends coaxially from the plug 46 and may have its upper end interposed between the plug and enclosure sides 44 and secured to both by the pin 48. The mesh of the fine screen cylinder 50 is fine enough to prevent perching birds from getting a toehold thereon while coarse enough to allow a toehold for clinging birds and some of the smaller ones with some clinging ability. It will be seen that this construction may be lighter in weight than the plug 18 shown in FIG. 1.

A conical shield 52, again preferably of stiff transparent plastic material, covers and coaxially surrounds the enclosure 42 so as to serve as both a shield therefor and a cover for the top thereof. The shield 52 flares downwardly and outwardly from the sides 44 of the enclosure 42 so as to provide a space therebetween adjacent their lower portions into which a clinging bird can move for access to food in the enclosure 42. Again, the lower edge of the shield 52 is at or preferably slightly below the sides 44 of the enclosure 42 to prevent direct access thereto by a bird in flight. Instead of being completely conical, the shield 52 could be frusto-conical (not shown) with its top opening snugly receiving the upper portion of the sides 44 of the enclosure 42, and the top of the latter provided with a removable cap (not shown), similar to that shown in FIG. 1.

The sides 44 of the enclosure 42 may be detachably secured to and within the shield 52 by a transverse pin 54 extending through the upper ends of the shield and enclosure. In this embodiment, no spacers are needed to maintain the desired spaced relationship between the shield 52 and the enclosure 42 since the latter substantially depends and hangs pendulum-like centrally from within the former. The pin 54 is removed to separate the shield 52 and enclosure 42 to enable the latter to be filled with bird food through its then open top. Again, the feeder 40 may be suspended from a tree limb or the equivalent by a cord 56 secured to a bail 58 attached to the shield 52. Alternatively, the feeder 40 may be supported on the upper end of a post 60, as illustrated in dotted lines, similar to the post support 32 for the feeder 10 shown in FIG. 1.

A further modification of a feeder 70 embodying this invention is shown in FIG. 3. In this, the enclosure 72 may be formed of wood, as shown, or of plastic and is of generally boxlike configuration, though relatively narrow in one horizontal dimension. One longer side 74 of the enclosure 72 is relatively open and may be constituted by only a few widely spaced bars or strips 76, of wood, plastic or metal, to prevent non-granular bird food from falling out of the enclosure 72. Secured in at least coextensive outwardly spaced relation to the relatively open side 74 of the enclosure 72, by appropriate supporting spacing members 78, is a sheild 80, again preferably of stiff transparent plastic material. The spacing between the shield 80 and the open side 74 of the enclosure 72 is small enough to prevent an undesirable bird from flying directly therebetween but large enough to enable a clinging bird to clingingly move therebetween. The shield 80 is at least coextensive with, and preferably extends somewhat below and laterally beyond, the open area of the side 74 to prevent a bird from having flight access to such side. The top of the space between the enclosure 72 and shield 80 is closed, as described hereinafter, to prevent a bird from lighting on top of the feeder 70 and reaching or clambering down into the space for access to food in the enclosure.

Access to the open side 74 of the enclosure 72 by a creeping bird, e.g. woodpecker, flicker, creeper, or the like, is had by a rough barklike surface which may be provided by a slab 82 of wood, or the equivalent, supported adjacent the open side 74 but uncovered by the shield 80 so that a creeping bird may light thereon, cling thereto, and clingingly move to the open side 74 of the enclosure 72 to feed. The slab 82 may be supported by any suitable means at one side of the open side 74, as shown in FIG. 3, or preferably at and depending below the lower extremity of the open side 74 as shown in FIG. 4. If positioned at one side of the open side 74, the upper edge 84 of the slab 82 is downwardly and outwardly steeply inclined, as shown, to prevent a bird from lighting thereon. The enclosure 72 may be provided with a hinged or otherwise openable cover 86, preferably having depending marginal flanges, as shown, to enable bird food to be placed readily in the enclosure. The cover 86 desirably is extended toward and over the top of the shield 80, as shown, to close the top of the space between the shield and the open side 74 of the enclosure 72.

Alternatively, as shown in FIG. 4, the upper end of the shield 80 may be positioned against the open side 74 of the enclosure 72 and the shield inclined downwardly and outwardly therefrom to provide the desired spacing therebetween adjacent their lower portions. In this arrangement the slab 82 desirably is positioned and depends below the lower end of the open side 74 of the enclosure 72.

As in the embodiments shown in FIGS. 1 and 2, the feeder 70 may be provided with a bail 88 by which it may be suspended, as by a cord 90, from a tree limb or the like. Alternatively, the feeder 70 may be supported on the upper end of a ground-engaging post 92, as shown in dotted lines. It also will be seen that the open side 74, shield 80 and rough-surface-defining means 82 may be duplicated on opposite sides of the enclosure 72.

In all embodiments it will be noted that the surface 18, 50, 82 to which clinging birds may cling to have access to food in the feeder is disposed at such a steep angle to the horizontal that birds cannot stand thereon without clinging thereto.

It thus will be seen that the objects of the invention have been fully and effectively accomplished. It will be realized, however, that the embodiments shown and described are only for the purpose of illustrating the principles of the invention, and that various modifications are possible. Accordingly, the scope of the invention is limited only to that encompassed by the following claims.

What is claimed is:

1. A selective bird feeder in which bird food is accessible to birds capable of clinging to a rough surface having a substantial angle from the horizontal but generally inaccessible to others, comprising:

means defining an enclosure for holding bird food;

at least a portion of the sides of said enclosure being of relatively open construction for enabling a bird to have access therethrough to bird food within said enclosure, the remainder of said enclosure-defining means being constructed to prevent such access therethrough;

shield means mounted exteriorly of said sides portion in position to prevent a bird from flying directly thereto, said shield means having at least a marginal edge portion disposed in generally coextensive spaced relation with said sides portion, the space between said shield means marginal edge portion and said sides portion being sufficient to permit a bird to enter therebetween by clinging movement but insufficient to permit a bird to fly directly thereinto and light therewithin, and means defining a rough surface, substantially uninterrupted throughout its extent and having a substantial angle from the horizontal, supported adjacent to said sides portion but uncovered by said shield means, said surface-defining means being constructed and positioned to enable a bird capable of substantially clinging to said surface to light thereon, cling thereto, and clingingly move therealong toward said sides portion for access through the latter to bird food within said enclosure but not to enable perching birds to light and find support thereon.

2. A bird feeder as defined in claim 1 including means forming a removable top for the enclosure.

3. A bird feeder as defined in claim 1 in which the surface-forming means is of wood.

4. A bird feeder as defined in claim 1 in which the surface-forming means is fine screening.

5. A bird feeder as defined in claim 1 in which the enclosure is formed of screening and is upright tubular in configuration, the shield means is of plastic material and generally concentric with said enclosure, and the rough surface is constituted by plug means forming the bottom of the enclosure and depending therefrom.

6. A bird feeder as defined in claim 5 in which the shield means is generally conical and is positioned over the enclosure.

7. A bird feeder as defined in claim 1 in which the enclosure is of generally boxlike configuration and includes a removable top, the shield means is planar and generally parallel to the sides portion, and said top extends over the upper edge of said shield means.

8. A bird feeder as defined in claim 6 including transverse pin means detachably securing the enclosure in depending relation to and within the shield means.

9. A bird feeder as defined in claim 1 in which the enclosure is of generally boxlike configuration, the shield means is generally planar and is inclined downwardly and outwardly from the upper edge of the sides portion, and the surface depends below the lower edge of said sides portion.

10. A bird feeder as defined in claim 6 in which the shield means is detachably secured to the enclosure and forms a top therefor.

* * * * *